US012148329B2

(12) United States Patent
Liu et al.

(10) Patent No.: US 12,148,329 B2
(45) Date of Patent: Nov. 19, 2024

(54) DISPLAY MODULE AND DISPLAY SCREEN

(71) Applicant: UNILUMIN GROUP CO., LTD, Shenzhen (CN)

(72) Inventors: Chengyou Liu, Shenzhen (CN); Jinxing Li, Shenzhen (CN); Longjiang Wu, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 210 days.

(21) Appl. No.: 17/863,755

(22) Filed: Jul. 13, 2022

(65) Prior Publication Data

US 2023/0055950 A1 Feb. 23, 2023

(30) Foreign Application Priority Data

Aug. 17, 2021 (CN) ........................ 202121930988.3

(51) Int. Cl.
*G09F 9/302* (2006.01)

(52) U.S. Cl.
CPC .................................. *G09F 9/3026* (2013.01)

(58) Field of Classification Search
CPC .. G06F 3/1446; H05K 5/0017; H05K 5/0026; G09F 9/3026
See application file for complete search history.

(56) References Cited

U.S. PATENT DOCUMENTS

2014/0340851 A1* 11/2014 Yomogita ........... B60R 11/0235 361/725
2017/0006727 A1* 1/2017 Ryu .................... H01L 25/0753
2018/0124932 A1 5/2018 Seo et al.
2019/0012955 A1* 1/2019 Xu ........................... G09F 9/33
2021/0274667 A1* 9/2021 Lin ...................... H05K 7/1401

FOREIGN PATENT DOCUMENTS

CN 201667180 U 12/2010
CN 204390649 U 6/2015
CN 110390892 A * 10/2019 ............. F16C 11/04
CN 210443175 U * 5/2020
CN 213483281 * 6/2021 ............ G09F 9/302

OTHER PUBLICATIONS

Extended European Search Report issued in counterpart European Patent Application No. 22185384.9, dated Apr. 21, 2023.

* cited by examiner

*Primary Examiner* — Daniel C Puentes
*Assistant Examiner* — Peter Krim
(74) *Attorney, Agent, or Firm* — Westbridge IP LLC

(57) ABSTRACT

Disclosed are a display module and a display screen. The display module includes: a first frame having a first attachment surface and a first assembly surface, an included angle between the first attachment surface and the first assembly surface being less than 90°; a locking rod movably provided on the first frame; a second frame having a second attachment surface and a second assembly surface, an included angle between the second attachment surface and the second assembly surface being less than 90°, the second assembly surface being parallel to the first assembly surface; and a locking piece provided on the second frame and having a locking hole matched with the locking rod. The display screen includes a first cabinet, a second cabinet and the display module.

13 Claims, 10 Drawing Sheets

DISPLAY MODULE AND DISPLAY SCREEN

CROSS-REFERENCE TO RELATED APPLICATIONS

This application claims priority to Chinese Patent Application No. 202121930988.3, filed on Aug. 17, 2021, the entire disclosure of which is incorporated herein by reference.

TECHNICAL FIELD

The present disclosure relates to the technical field of display screens, and in particular, to a display module and a display screen with the display module.

BACKGROUND

Existing LED displays are usually spliced by multiple display units. As LED display technology develops, the splicing methods of LED displays on the market have become increasingly diverse, and various structural forms such as arc splicing, right-angle splicing, and three-dimensional splicing have emerged. Display units that can achieve right-angle splicing and other splicing methods usually have an inclined surface on the edge of the cabinet. The display surfaces of the two display units can be formed at a certain angle by fitting the inclined surfaces of the edges of the two cabinets together. Although such a display unit can be easily spliced at right angles, it is difficult to align the display unit by plane splicing due to the slope of its edge, which leads to a decrease in the versatility of the display unit. Therefore, when a flat LED display is required, it is necessary to additionally purchase or lease a display unit without the inclined surface on the edge, resulting in additional equipment costs.

SUMMARY

The technical problem to be solved by the present disclosure is to provide a display module and a display screen with the display module, which can make the display unit with the inclined surface on the edge easy to perform plane splicing.

In order to address the above technical problem, the present disclosure provides a display module, including: a first frame having a first attachment surface and a first assembly surface, an included angle between the first attachment surface and the first assembly surface being less than 90°; a locking rod movably provided on the first frame; a second frame having a second attachment surface and a second assembly surface, an included angle between the second attachment surface and the second assembly surface being less than 90°, the second assembly surface being parallel to the first assembly surface; and a locking piece provided on the second frame and having a locking hole matched with the locking rod.

In an embodiment, the first assembly surface is provided with a first through hole for the locking rod to pass through, the second assembly surface is provided with a second through hole aligned with both the first through hole and the locking hole.

In an embodiment, the locking piece includes a locking base and a locking plate movably provided on the locking base, the locking hole is provided on the locking base, and the locking plate has a through hole staggered from the locking hole.

In an embodiment, one end of the locking rod close to the second frame is provided with a locking head, and an outer peripheral wall of the locking head is provided with a clamping slot matched with the locking plate.

In an embodiment, the locking base includes a bottom plate and a cover plate, and the bottom plate and the cover plate are configured to form a cavity for accommodating part of the locking plate.

In an embodiment, an elastic component is provided in the cavity, one end of the elastic component in a moving direction is abutted against the cover plate, and the other end of the elastic component in the moving direction is abutted against the locking plate to drive the locking plate to move away from the locking base.

In an embodiment, the cover plate is provided with a protruding guide column, the locking plate is provided with a guide groove, the guide column extends into the guide groove, and a length direction of the guide groove is consistent with a moving direction of the locking plate.

In an embodiment, one end of the locking rod away from the second frame is provided with a handle.

In order to address the above technical problem, the present disclosure further provides a display screen, including: a first cabinet, a second cabinet; and the display module as described above. An edge of the first cabinet is provided with a first inclined surface, an edge of the second cabinet is provided with a second inclined surface, the first frame is provided on the first cabinet, the first attachment surface is attached to the first inclined surface, the second frame is provided on the second cabinet, and the second attachment surface is attached to the second inclined surface.

In an embodiment, the first cabinet is provided with a first plane portion, the first frame has a first mounting portion attached to the first plane portion, the second cabinet is provided with a second plane portion, and the second frame has a second mounting portion attached to the second plane portion.

In technical solutions of the present disclosure, a first frame attached to the first inclined surface of the first cabinet is installed on the first cabinet, a second frame attached to the second inclined surface of the second cabinet is installed on the second cabinet, and the first assembly surface of the first frame is parallel to the second assembly surface of the second frame. Then, the first assembly surface is attached to the second assembly surface, the first cabinet and the second cabinet can be spliced together through the cooperation of the locking rod provided on the first frame and the locking piece provided on the second frame. The display surface of the first cabinet and the display surface of the second cabinet are located on the same horizontal plane, to realize the plane splicing of the display screen, and enable the display screen to perform arc splicing, right-angle splicing and three-dimensional splicing. It is also possible to realize plane splicing by installing the display module, making the display screen more versatile to meet various usage requirements of users, the first cabinet and the second cabinet can be spliced or disassembled conveniently through the cooperation of the locking rod and the locking piece on the display module.

DETAILED DESCRIPTION OF THE EMBODIMENTS

Figure 1:
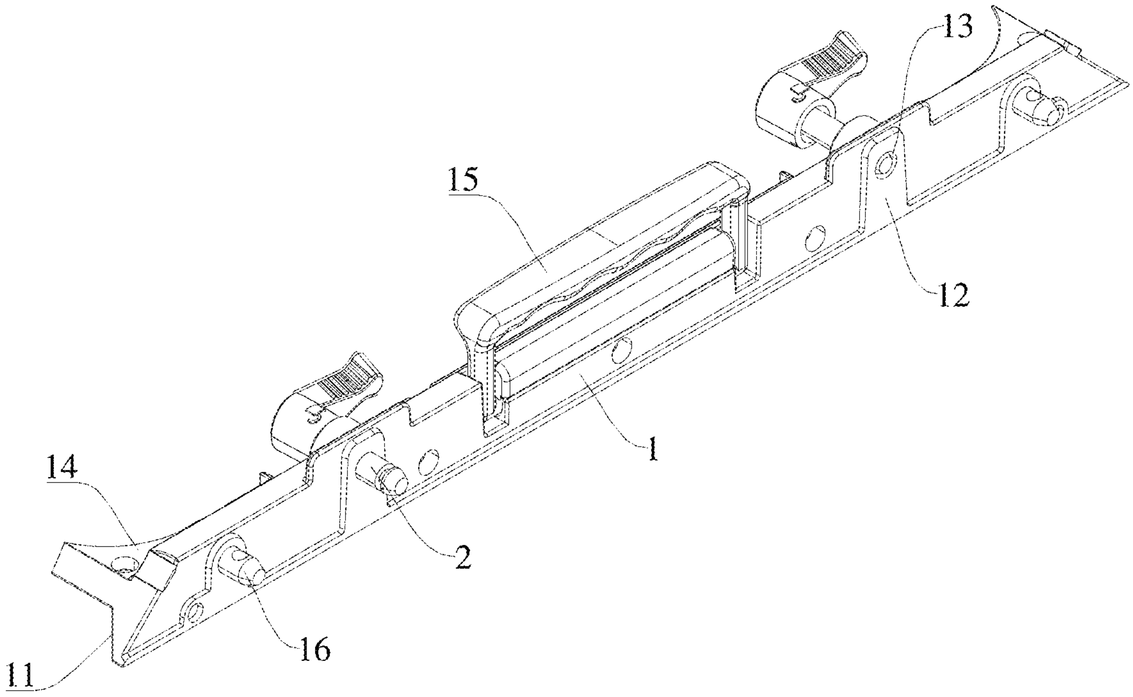
FIG. 1 is a schematic structural view of a first frame in a display module according to an embodiment of the present disclosure.
Figure 2:
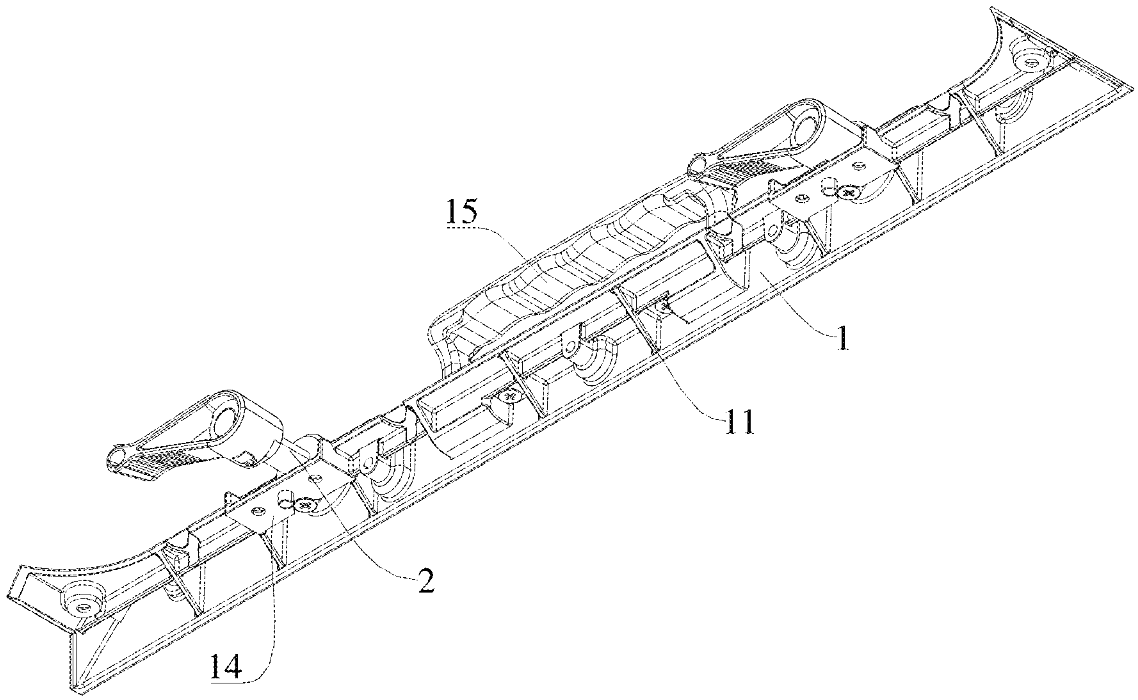
FIG. 2 is a schematic structural view of the first frame in the display module according to an embodiment of the present disclosure from another perspective.
Figure 3:
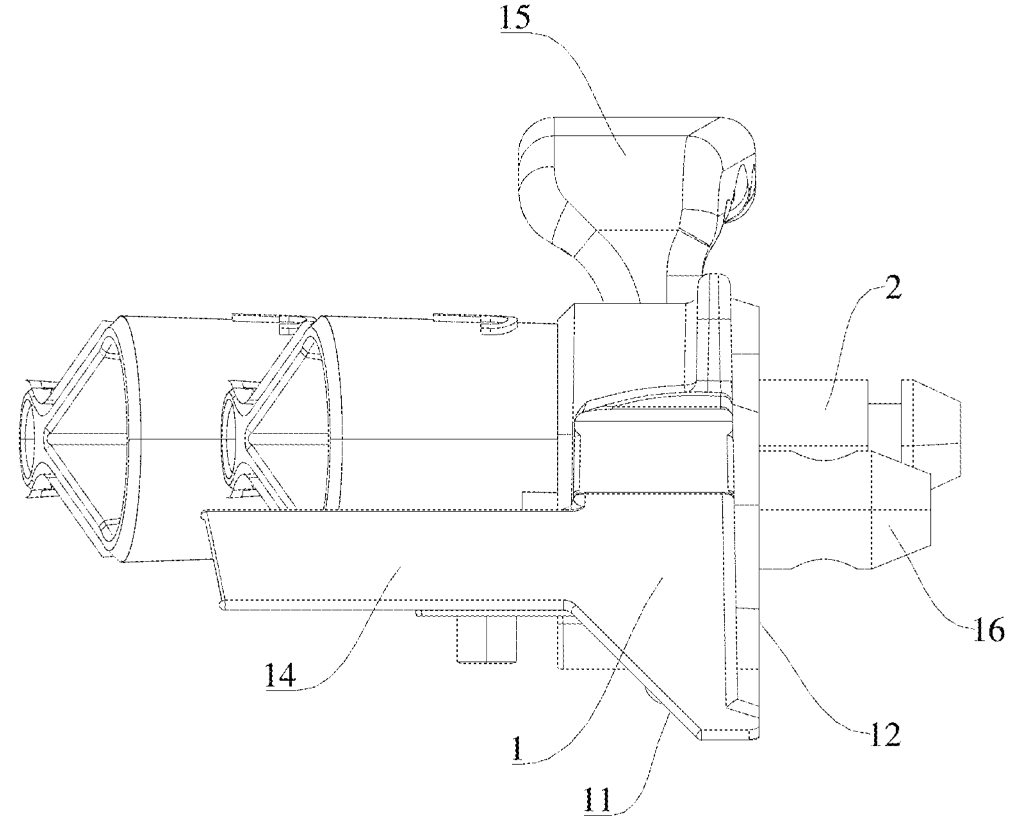
FIG. 3 is a side view of the first frame in the display module according to an embodiment of the present disclosure.

In order to describe the technical contents, achieved objects and effects of the present disclosure in detail, the following descriptions are given with reference to the embodiments and the accompanying drawings.

First Embodiment

As shown in FIG. 1 to FIG. 9, the first embodiment of the present disclosure provides a display module installed in the display unit of the display screen. The display module is configured to cover the inclined surface of the edge of the cabinet of the display unit, and the edge of the cabinet is flat, to realize the plane splicing of the two display units.

As shown in FIG. 1 to FIG. 6, the display module includes a first frame 1 and a second frame 3 respectively installed on two cabinets. The first frame 1 has a first attachment surface 11 and a first assembly surface 12. An included angle between the first attachment surface 11 and the first assembly surface 12 is less than 90°. The first attachment surface 11 is attached to an inclined surface of the cabinet. A second frame 3 has a second attachment surface 31 and a second assembly surface 32. An included angle between the second attachment surface 31 and the second assembly surface 32 is less than 90°. The second attachment surface 31 is attached to the inclined surface of the cabinet. The second assembly surface 32 is parallel to the first assembly surface 12. After installing the first frame 1 on one of the two cabinets, and installing the second frame 3 on the other cabinet, the display surfaces of the two display units can be located on the same horizontal plane by attaching the first assembly surface 12 and the second assembly surface 32. In this embodiment, the first frame 1 and the second frame 3 completely cover the inclined surfaces on the cabinets respectively, and the overall structure of the two cabinets is stable after splicing.

The first frame 1 is provided with a locking rod 2 and a first through hole 13 for the locking rod 2 to pass through. The first through hole 13 is provided on the first assembly surface 12 and the locking rod 2 is movably provided in the first through hole 13 along an axial direction of the first through hole 13. The second frame 3 is provided with a locking piece 4 and the locking piece 4 has a locking hole 41 matched with the locking rod 2. The second assembly surface 32 is provided with a second through hole 33. The first through hole 13, the second through hole 33 and the locking hole 41 are aligned in sequence for the locking rod 2 to pass through. After the first frame 1 and the second frame 3 are aligned and attached, one end of the locking rod 2 can be inserted into the locking hole 41 and can be clamped with the locking piece 4 to fix the relative position of the first frame 1 and the second frame 3. The two cabinets on which the first frame 1 and the second frame 3 are respectively installed are spliced together, to realize the plane splicing of the two display units.

Figure 4:
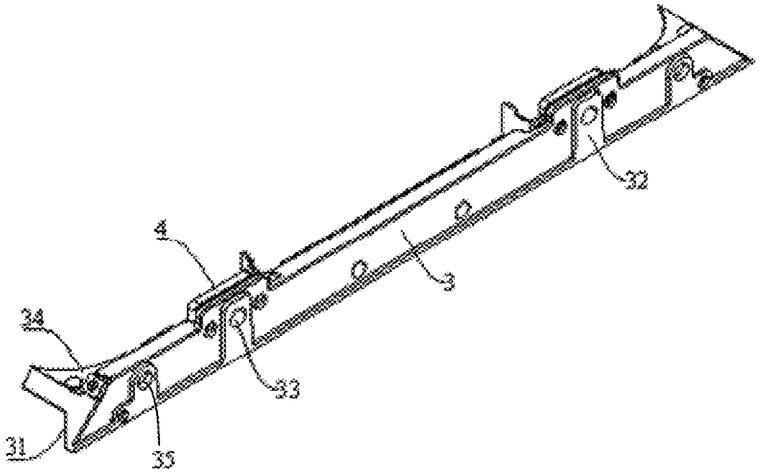
FIG. 4 is a schematic structural view of a second frame in the display module according to an embodiment of the present disclosure.
Figure 5:
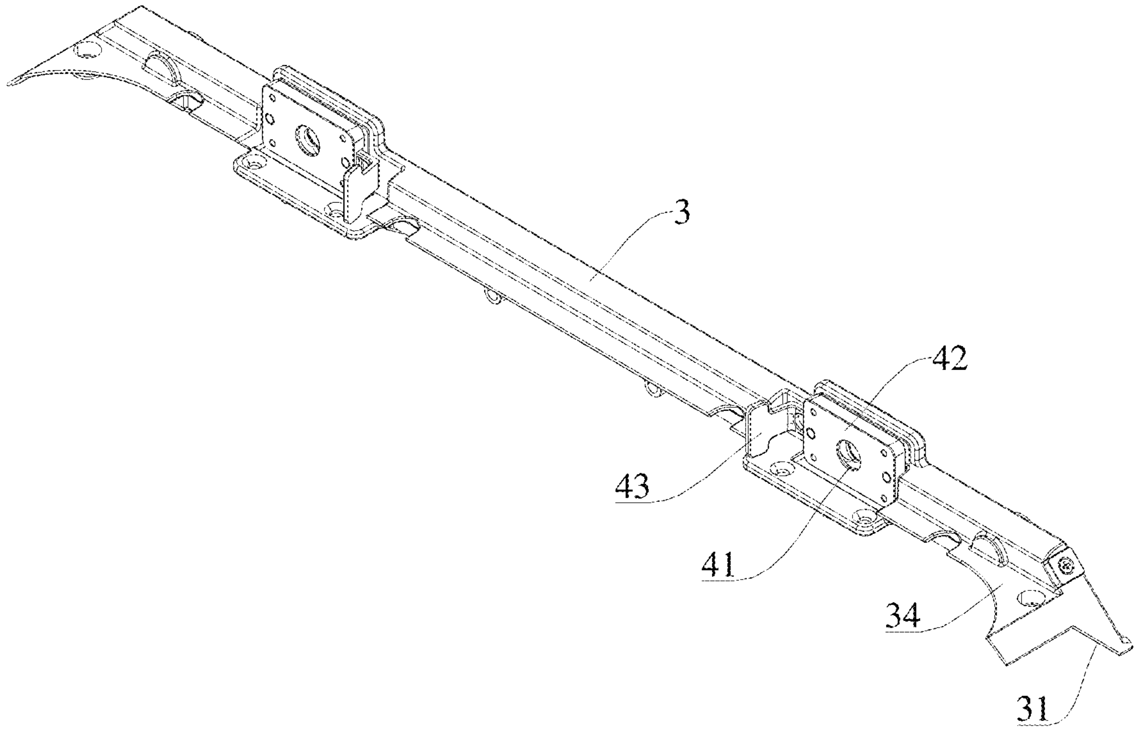
FIG. 5 is a schematic structural view of the second frame in the display module according to an embodiment of the present disclosure from another perspective.
Figure 6:
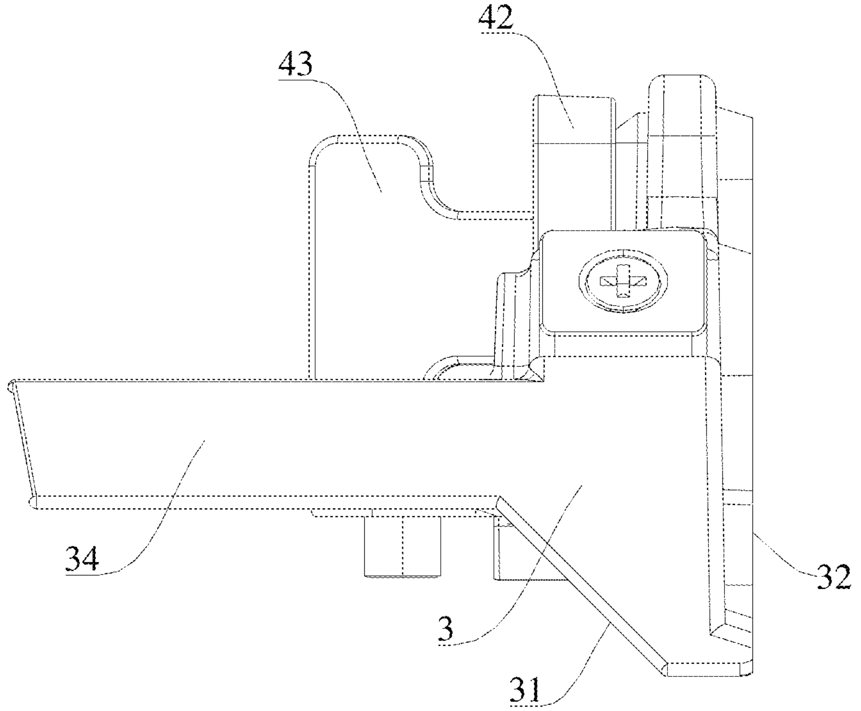
FIG. 6 is a side view of the second frame in the display module according to an embodiment of the present disclosure.

As shown in FIG. 1 and FIG. 4, in order to align the first frame 1 and the second frame 3 when splicing, two positioning pins 16 are spaced apart on the side of the first frame 1 close to the second frame 3. The side of the second frame 3 close to the first frame 1 is provided with positioning holes 35 aligned with the two positioning pins 16 one-to-one. When splicing the two display units installed with the first frame 1 and the second frame 3 respectively, the first frame 1 can be quickly aligned with the second frame 3 through the cooperation of the positioning pins 16 and the positioning holes 35, and the first through hole 13 on the first frame 1 is also aligned with the second through hole 33 on the second frame 3. The first frame 1 and the second frame 3 can be assembled conveniently by operating the locking rod 2 to slide toward the locking piece 4.

Figure 7:
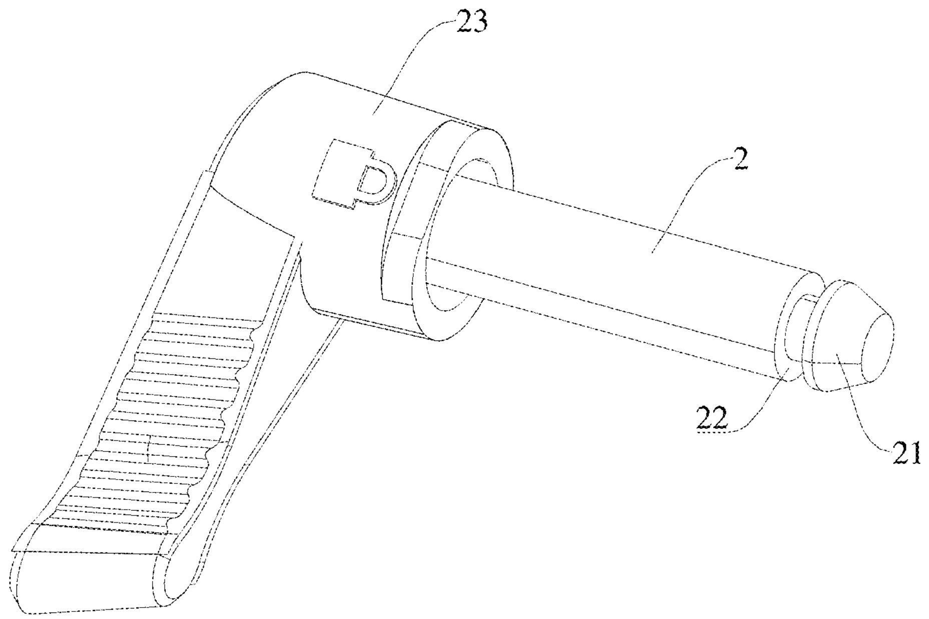
FIG. 7 is a schematic structural view of a locking rod in the display module according to an embodiment of the present disclosure.
Figure 8:
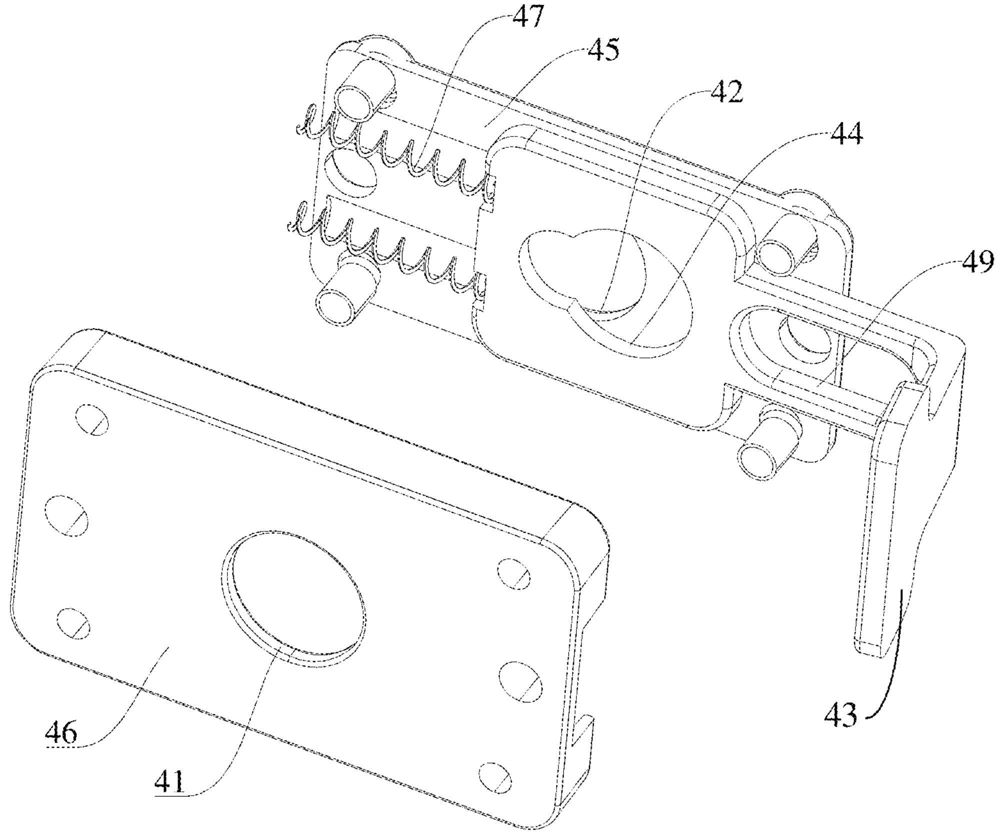
FIG. 8 is a partial exploded view of a locking piece in the display module according to an embodiment of the present disclosure.
Figure 9:
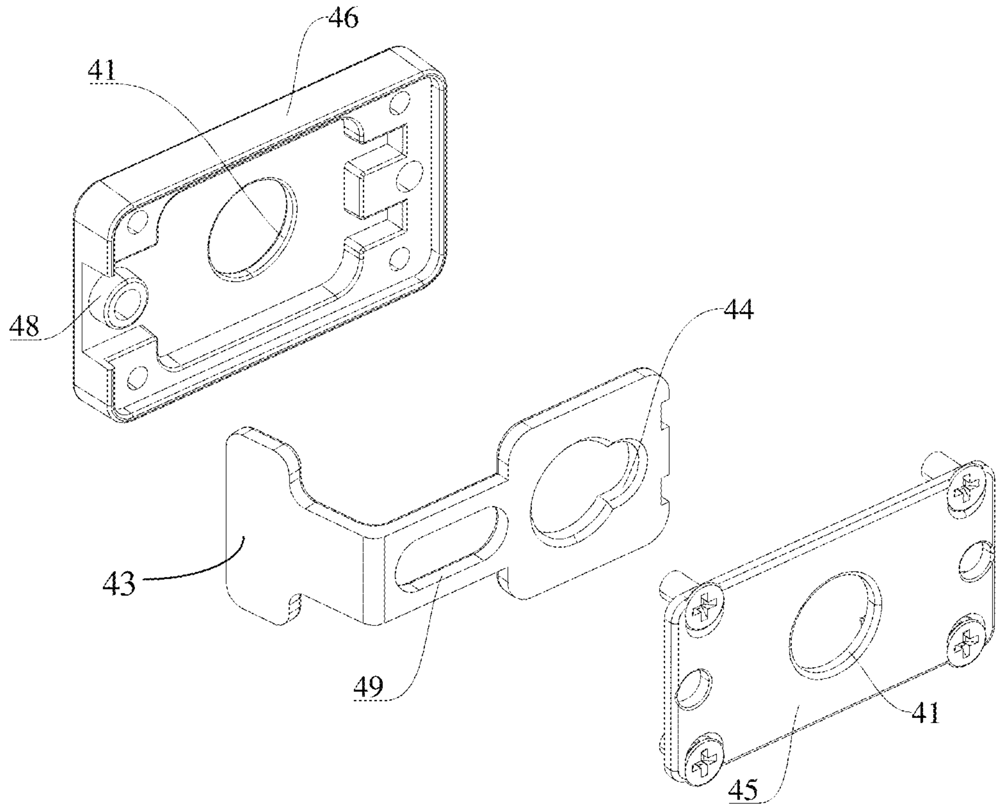
FIG. 9 is another partial exploded view of the locking piece in the display module according to an embodiment of the present disclosure.
Figure 10:
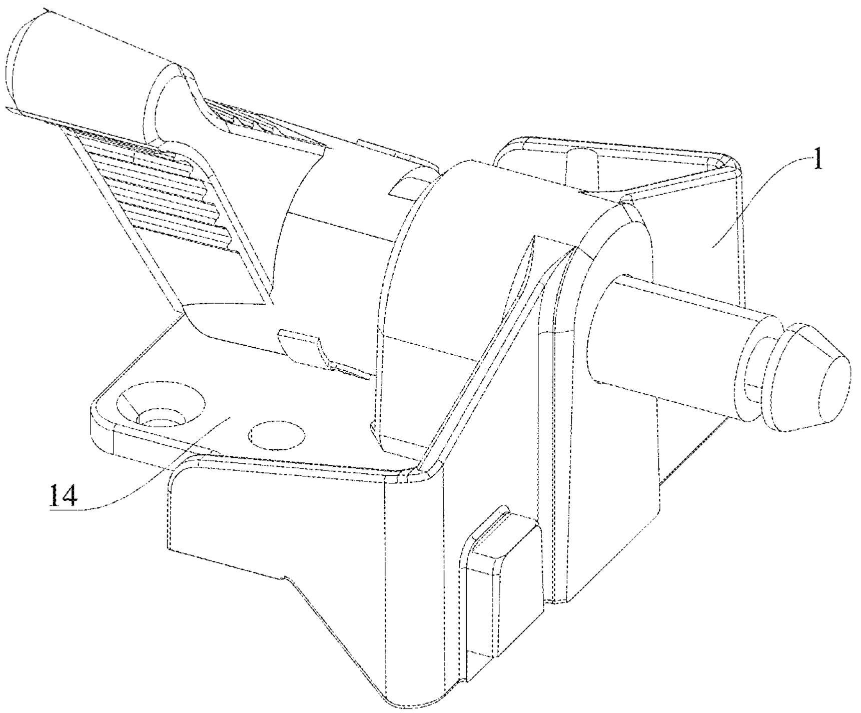
FIG. 10 is a schematic structural view of a first frame in a display module according to an embodiment of the present disclosure.
Figure 11:
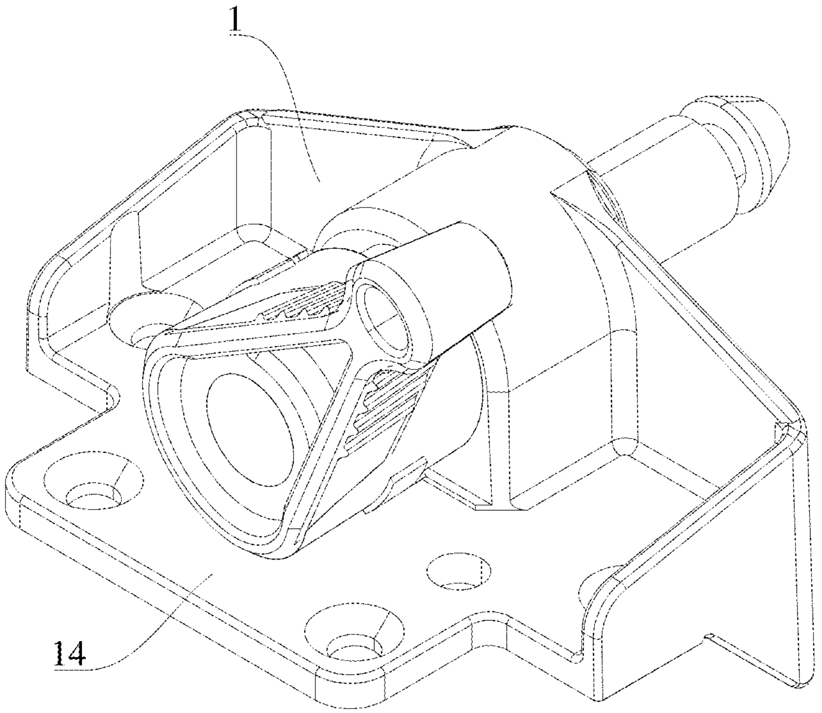
FIG. 11 is a schematic structural view of the first frame in the display module according to an embodiment of the present disclosure from another perspective.
Figure 12:
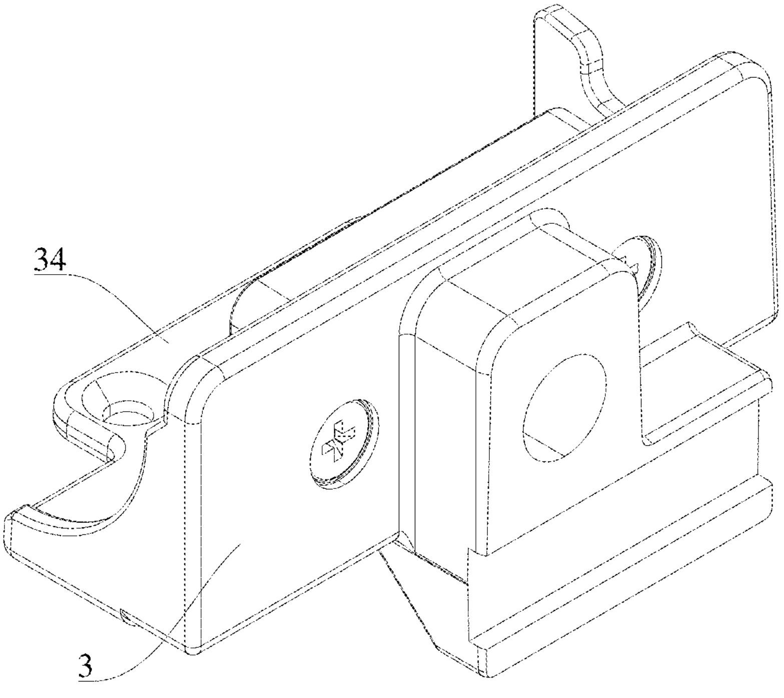
FIG. 12 is a schematic structural view of a second frame in the display module according to an embodiment of the present disclosure.
Figure 13:
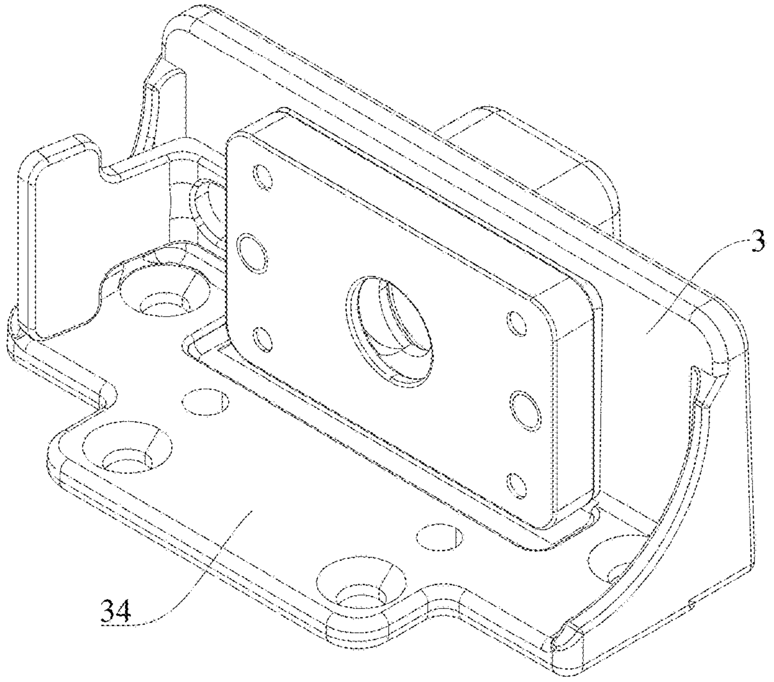
FIG. 13 is a schematic structural view of the second frame in the display module according to an embodiment of the present disclosure from another perspective.
Figure 14:
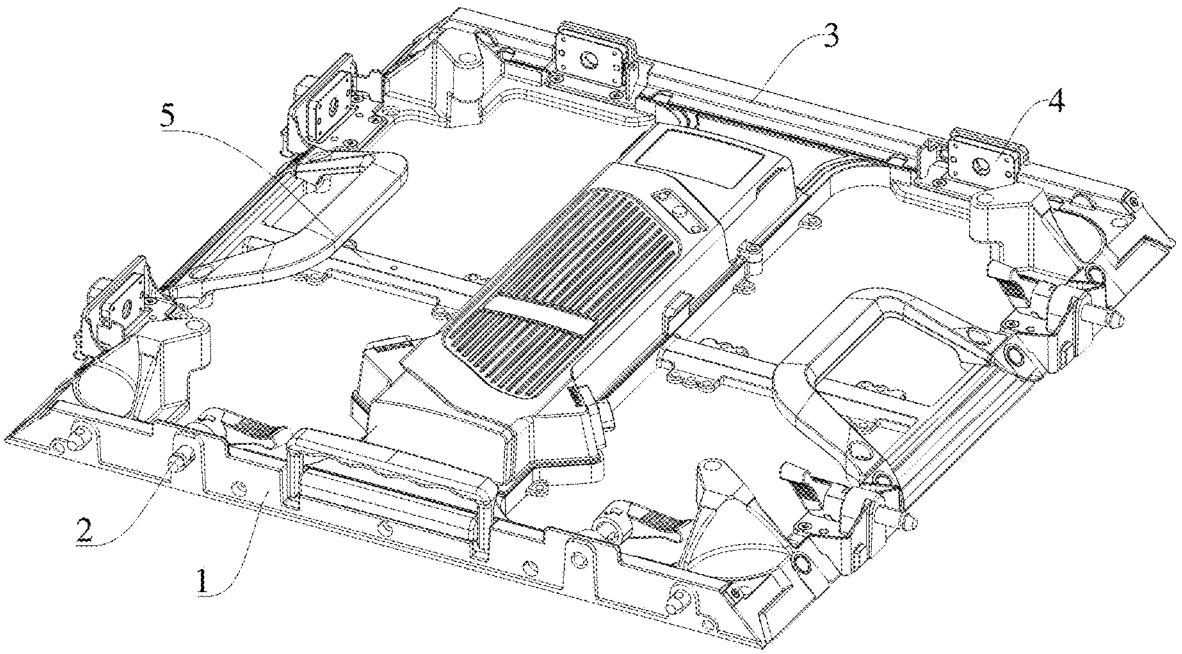
FIG. 14 is a partial schematic structural view of a display screen according to a third embodiment of the present disclosure.
Figure 15:
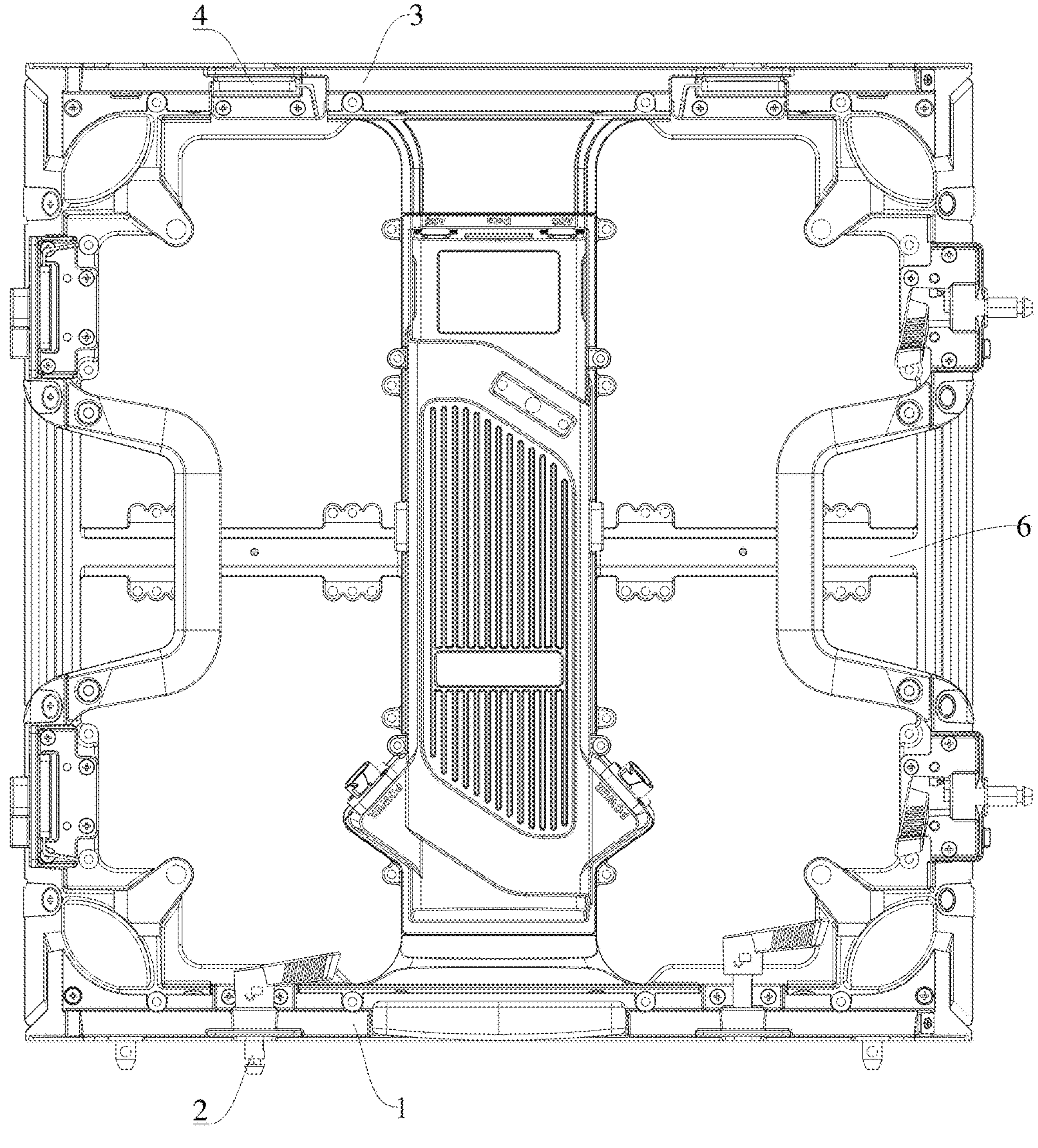
FIG. 15 is another partial schematic structural view of the display screen according to the third embodiment of the present disclosure.
Figure 16:
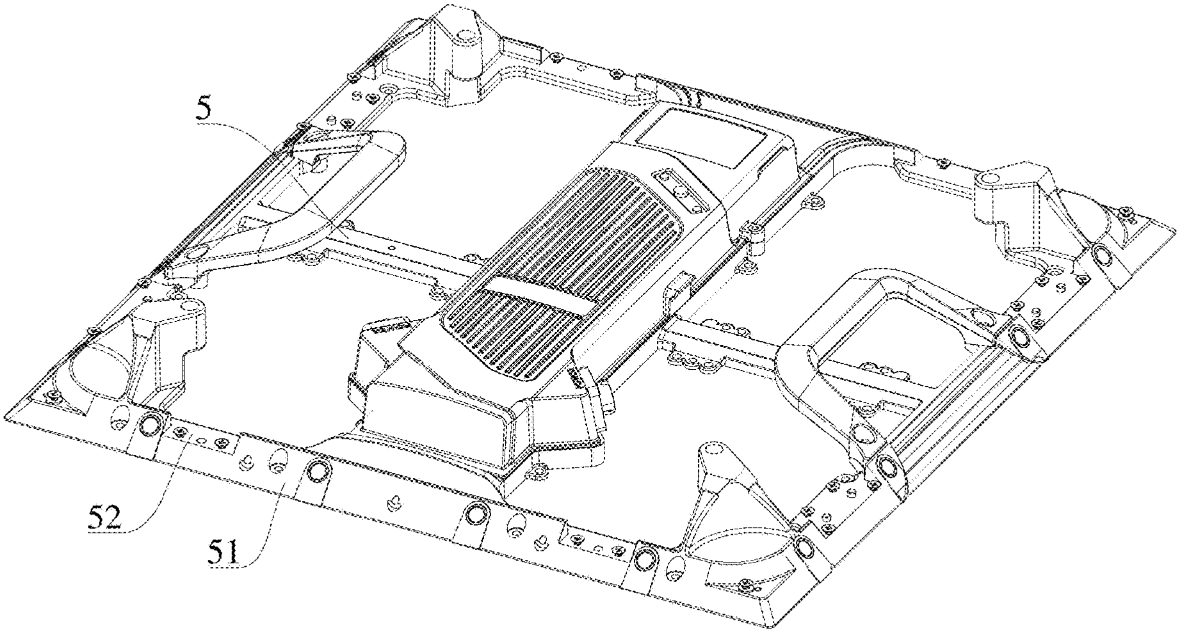
FIG. 16 is a schematic structural view of a first cabinet in the display screen according to the third embodiment of the present disclosure.
Figure 17:
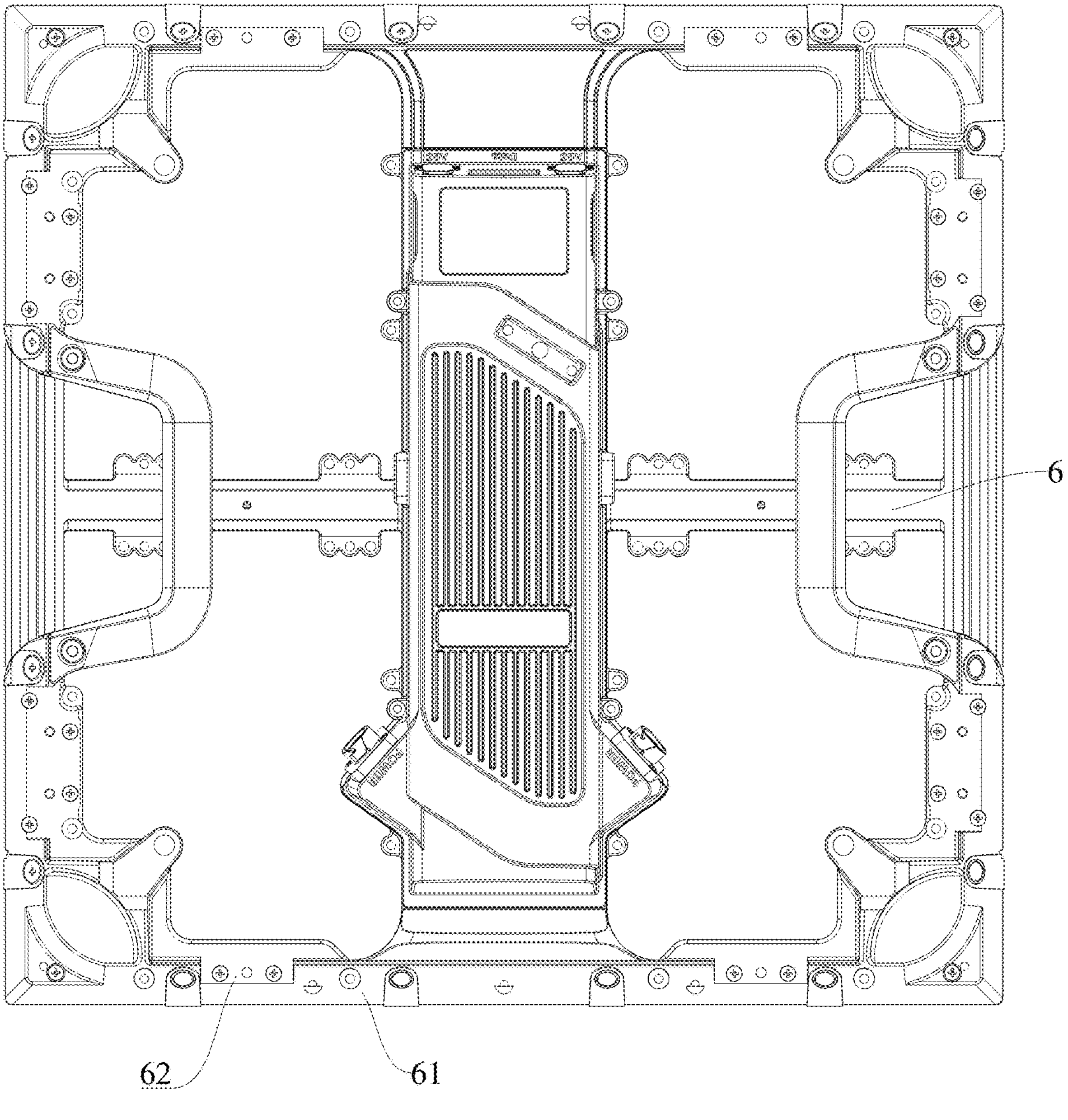
FIG. 17 is a schematic structural view of a second cabinet in the display screen according to the third embodiment of the present disclosure.

As shown in FIG. 7 to FIG. 9, one end of the locking rod 2 close to the locking piece 4 has a locking head 21. An outer peripheral wall of the locking head 21 is provided with a clamping slot 22 around the locking head 21. The locking piece 4 includes a locking base 42 and a locking plate 43 movably provided on the locking base 42. The locking hole 41 is provided on the locking base 42 and the locking head 21 can pass through the locking base 42. The locking plate 43 is provided with a through hole 44 which is staggered from the locking hole 41. The locking plate 43 is operated to move on the locking base 42. The through hole 44 is aligned with the locking hole 41, and the locking head 21 can pass through the locking plate 43. After the locking head 21 partially passes through the through hole 44, the locking plate 43 can be clamped with the clamping slot 22 by operating the locking plate 43 to reset. Then, the locking head 21 is fixed on the locking base 42 to realize the locking of the first frame 1 and the second frame 3. When disassembling the first frame 1 and the second frame 3, the locking plate 43 is operated to move and align the through hole 44 with the locking hole 41, and the locking head 21 can be withdrawn from the locking plate 43 to release the locking of the first frame 1 and the second frame 3. In an embodiment, the end of the locking rod 2 away from the locking piece 4 has a handle 23. By operating the handle 23, the locking rod 2 can be conveniently pushed and pulled to make the locking rod 2 move in the first through hole 13.

The locking base 42 includes a bottom plate 45 and a cover plate 46 fixedly connected to the bottom plate 45. The bottom plate 45 and the cover plate 46 form a cavity for accommodating the locking plate 43, and one end of the locking plate 43 extends out of the cavity to facilitate the movement of the locking plate 43. The cavity is provided with an elastic component 47 that drives the locking plate 43 to move away from the locking base 42. One end of the elastic component 47 in the moving direction abuts against the cover plate 46, and the other end abuts against the locking plate 43. The through hole 44 on the locking plate 43 is kept in a state of being misplaced with the locking hole 41 on the locking base 42, that is, the locking rod 2 is clamped with the locking piece 4 to prevent the locking rod 2 from loosening. When the locking plate 43 is pressed, the locking plate 43 enters the cavity and the through hole 44 is aligned with the locking hole 41, the elastic component 47 is compressed under the action of external force, the locking head 21 passes through the locking plate 43 or exits the locking plate 43 and then releases the locking plate 43 to automatically reset the locking plate 43 under the driving of the elastic component 47.

In an embodiment, the locking plate 43 is provided with a guide groove 49 and the cover plate 46 is provided with a guide column 48 extending into the guide groove 49. A length direction of the guide groove 49 is consistent with a moving direction of the locking plate 43. The movement of the locking plate 43 on the locking base 42 is limited by the abutment between the guide column 48 and the end of the locking plate 43, to prevent the locking plate 43 from falling off the locking base 42.

As shown in FIG. 1 and FIG. 4, in this embodiment, the first frame 1 is provided with two locking rods 2 spaced apart from each other. The second frame 3 is provided with two locking pieces 4 spaced apart from each other, and the two locking pieces 4 are respectively aligned with the two locking rods 2 on the first frame 1 one by one, to stabilize the connection between the first frame 1 and the second frame 3, and prevent unintended relative movement between the first frame 1 and the second frame 3 after splicing, resulting in dislocation of the two cabinets.

The first frame 1 is also provided with a rotatable handle 15, and the display module and the cabinet on which the display module is installed can be conveniently carried by the hand-held handle 15.

Second Embodiment

As shown in FIG. 10 to FIG. 13, the second embodiment of the present disclosure is another technical solution proposed for the structures of the first frame 1 and the second frame 3 on the basis of the first embodiment. The difference from the first embodiment is that the structures of the first frame 1 and the second frame 3 in the second embodiment are different from those of the counterparts in the first embodiment.

As shown in FIG. 10 to FIG. 13, in this embodiment, the first frame 1 and the second frame 3 respectively cover part of the inclined surfaces of the cabinets, and several first frames 1 or second frames 3 can be installed at intervals on the same inclined surface of the cabinet, which ensures the stable connection between the two adjacent cabinets and saves the materials to manufacture the display module. It is beneficial to reduce the overall weight of the display module, and the display module can be adapted to cabinets of various sizes, so that the display module is more versatile.

Third Embodiment

As shown in FIG. 1 to FIG. 17, the third embodiment of the present disclosure provides a display screen, including two display units. One display unit has a first cabinet 5, the other display unit has a second cabinet 6. The display screen further includes the display module in the first embodiment and the display module in the second embodiment.

As shown in FIG. 1 to FIG. 17, in this embodiment, the first cabinet 5 and the second cabinet 6 are respectively rectangular. The edge of the first cabinet 5 has a first inclined surface 51, and the first inclined surface 51 is matched with the first attachment surface 11 of the first frame 1 to install the first frame 1 on the first cabinet 5. The edge of the second cabinet 6 has a second inclined surface 61 and the second inclined surface 61 is matched with the second attachment surface 31 of the second frame 3 to install the second frame 3 on the second cabinet 6. The first cabinet 5 is aligned with the second cabinet 6 through the cooperation between the first assembly surface 12 on the first frame 1 and the second assembly surface 32 on the second frame 3, the display surfaces of the two display units are located on the same horizontal plane, the locking rod 2 on the first frame 1 cooperates with the locking piece 4 on the second frame 3 to realize the horizontal splicing of the first cabinet 5 and the second cabinet 6.

One of the two first inclined surfaces 51 opposite to the first cabinet 5 is provided with the first frame 1, and the other first inclined surface 51 is provided with the second frame 3. One of the two second inclined surfaces 61 opposite to the second cabinet 6 is provided with the second frame 3, the other second inclined surface 61 is provided with the first frame 1, so that the plurality of first cabinets 5 and the plurality of second cabinets 6 can be sequentially spliced to form a large-area display screen.

As shown in FIG. 1, FIG. 2, FIG. 4, FIG. 5, FIG. 16 and FIG. 17, the first cabinet 5 is also provided with a first plane portion 52, the first plane portion 52 communicates with the first inclined surface 51, and the first frame 1 is provided with a first mounting portion 14 matched with the first plane portion 52. After the first frame 1 is installed on the first cabinet 5, the first mounting portion 14 is attached to the first plane portion 52, and the first mounting portion 14 is connected to the first plane portion 52 by connecting parts such as screws, to fix the first frame 1 on the first cabinet 5. The second cabinet 6 is also provided with a second plane portion 62, the second plane portion 62 communicates with the second inclined surface 61, and the second frame 3 is provided with a second mounting portion 34 matched with the second plane portion 62. After the second frame 3 is installed on the second cabinet 6, the second mounting portion 34 is attached to the second plane portion 62, and the second mounting portion 34 is connected to the second plane portion 62 by connecting parts such as screws, to fix the second frame 3 on the second cabinet 6. In this way, the connection between the first frame 1 and the first cabinet 5, the second frame 3 and the second cabinet 6 is realized, ensure that the first frame 1 and the first cabinet 5 are tightly connected and the second frame 3 and the second cabinet 6 are tightly connected, so that the large-area display screen formed by splicing is stable.

In summary, the present disclosure provides a display module. The first frame has a first attachment surface matched with the first inclined surface on the first cabinet, the second frame has a second attachment surface matched with the second inclined surface on the second cabinet, to realize the connection between the first frame and the first cabinet and the connection between the second frame and the second cabinet. The first assembly surface of the first frame is parallel to the second assembly surface of the second frame. The cooperation of the first assembly surface and the second assembly surface can splice the first cabinet with the first frame and the second cabinet with the second frame into a plane. The display surfaces of the two display units with the first cabinet and the second cabinet are on the same horizontal plane, which meets the needs of users who need plane splicing of multiple display units. The first cabinet and the second cabinet after disassembling the display module can be spliced by arc surface, right angle and three-dimensional, with good versatility. The first frame in the display module is provided with a movable locking rod. The second frame is provided with a locking piece matched with the locking rod. When plane splicing the first cabinet and the second cabinet, after the first cabinet is aligned with the second cabinet, the lock rod is pushed to extend into the locking hole on the lock plate to splice the first cabinet and the second cabinet into a whole. The efficiency of splicing a plurality of display units into a large-size flat display screen is improved, and the operation is simple and the disassembly and assembly are convenient.

The above descriptions are only the embodiments of the present disclosure, and are not intended to limit the scope of the present disclosure. All equivalent transformations made by using the contents of the description and drawings of the present disclosure, or directly or indirectly applied in the relevant technical fields, are included in the scope of the present disclosure.

What is claimed is:

1. A display module, comprising:

a first frame having a first attachment surface and a first assembly surface, an included angle between the first attachment surface and the first assembly surface being less than 90°;

a locking rod movably provided on the first frame;

a second frame having a second attachment surface and a second assembly surface, an included angle between the second attachment surface and the second assembly surface being less than 90°, the second assembly surface being parallel to the first assembly surface; and a locking piece provided on the second frame and having a locking hole matched with the locking rod, wherein the first assembly surface is provided with a first through hole for the locking rod to pass through, the second assembly surface is provided with a second through hole aligned with both the first through hole and the locking hole, the locking piece comprises a locking base and a locking plate movably provided on the locking base, the locking hole is provided on the locking base, and the locking plate has a through hole staggered from the locking hole.

2. The display module of claim 1, wherein one end of the locking rod close to the second frame is provided with a locking head, and an outer peripheral wall of the locking head is provided with a clamping slot matched with the locking plate.

3. The display module of claim 1, wherein the locking base comprises a bottom plate and a cover plate, and the bottom plate and the cover plate are configured to form a cavity for accommodating part of the locking plate.

4. The display module of claim 3, wherein an elastic component is provided in the cavity, one end of the elastic component in a moving direction is abutted against the cover plate, and the other end of the elastic component in the moving direction is abutted against the locking plate to drive the locking plate to move away from the locking base.

5. The display module of claim 3, wherein the cover plate is provided with a protruding guide column, the locking plate is provided with a guide groove, the guide column extends into the guide groove, and groove displacement is consistent with the engaging and disengaging moving direction of the locking plate.

6. The display module of claim 1, wherein one end of the locking rod away from the second frame is provided with a handle.

7. A display screen, comprising:

a first cabinet;

a second cabinet; and a display module, comprising:

a first frame having a first attachment surface and a first assembly surface, an included angle between the first attachment surface and the first assembly surface being less than 90°;

a locking rod movably provided on the first frame;

a second frame having a second attachment surface and a second assembly surface, an included angle between the second attachment surface and the second assembly surface being less than 90°, the second assembly surface being parallel to the first assembly surface; and a locking piece provided on the second frame and having a locking hole matched with the locking rod;

wherein an edge of the first cabinet is provided with a first inclined surface, an edge of the second cabinet is provided with a second inclined surface, the first frame is provided on the first cabinet, the first attachment surface is attached to the first inclined surface, the second frame is provided on the second cabinet, and the second attachment surface is attached to the second inclined surface, wherein the first assembly surface is provided with a first through hole for the locking rod to pass through, the second assembly surface is provided with a second through hole aligned with both the first through hole and the locking hole, the locking piece comprises a locking base and a locking plate movably provided on the locking base, the locking hole is provided on the locking base, and the locking plate has a through hole staggered from the locking hole.

8. The display screen of claim 7, wherein the first cabinet is provided with a first plane portion, the first frame has a first mounting portion attached to the first plane portion, the second cabinet is provided with a second plane portion, and the second frame has a second mounting portion attached to the second plane portion.

9. The display screen of claim 7, wherein one end of the locking rod close to the second frame is provided with a locking head, and an outer peripheral wall of the locking head is provided with a clamping slot matched with the locking plate.

10. The display screen of claim 7, wherein the locking base comprises a bottom plate and a cover plate, and the bottom plate and the cover plate are configured to form a cavity for accommodating part of the locking plate.

11. The display screen of claim 10, wherein an elastic component is provided in the cavity, one end of the elastic component in a moving direction is abutted against the cover plate, and the other end of the elastic component in the moving direction is abutted against the locking plate to drive the locking plate to move away from the locking base.

12. The display screen of claim 10, wherein the cover plate is provided with a protruding guide column, the locking plate is provided with a guide groove, the guide column extends into the guide groove, and groove displacement is consistent with the engaging and disengaging moving direction of the locking plate.

13. The display screen of claim 7, wherein one end of the locking rod away from the second frame is provided with a handle.

* * * * *